Figure 1:
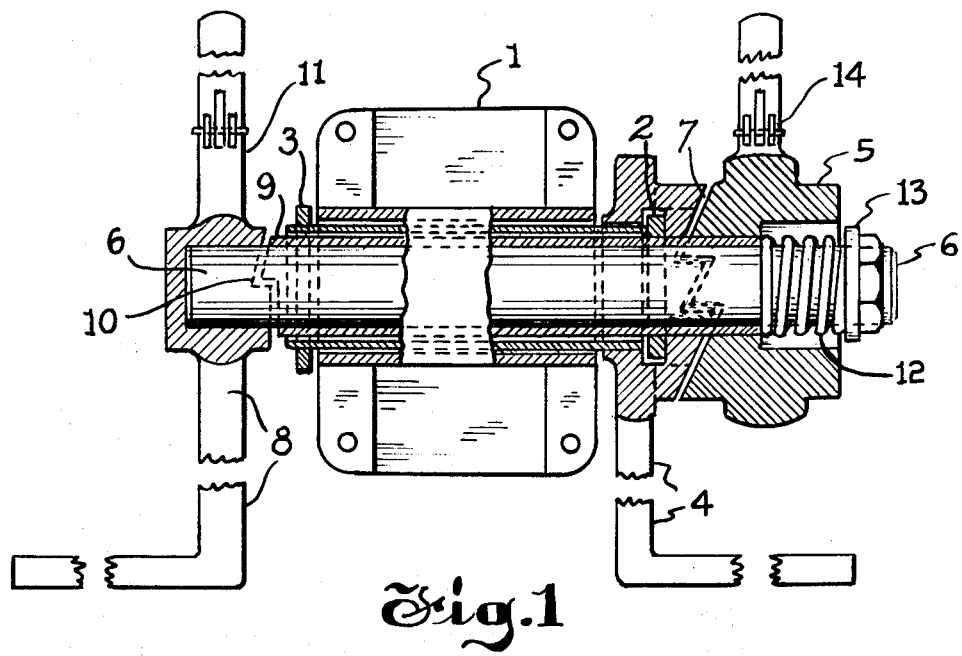

United States Patent

[11] 3,580,370

| [72] | Inventor | James Elvin McCammon<br>224 1/2 E. Broadway, West Memphis, Ark. 72301 |
|---|---|---|
| [21] | Appl. No. | 756,740 |
| [22] | Filed | Aug. 29, 1968 |
| [45] | Patented | May 25, 1971 |

[54] AUTOMATIC ACCELERATOR SAFETY DEVICE
2 Claims, 4 Drawing Figs.

[52] U.S. Cl............................................... 192/3,
192/89, 74/483, 74/513
[51] Int. Cl.......................................... F16d 67/00
[50] Field of Search............................................ 192/3

[56] References Cited
UNITED STATES PATENTS

| 1,608,809 | 11/1926 | Quintenz...................... | 192/3 |
| 2,657,778 | 11/1953 | Nallinger...................... | 192/3 |
| 2,713,404 | 7/1955 | Rodeback ..................... | 192/3 |
| 2,816,633 | 12/1957 | Schumann..................... | 192/3X |
| 2,982,382 | 5/1961 | Strauss ......................... | 192/3 |

*Primary Examiner*—Benjamin W. Wyche

ABSTRACT: My invention is an Automatic Accelerator Safety Device, a means for braking and accelerating an automobile equipped with an automatic transmission, where the optional phases speed, and direction, are manually controlled, and the remaining functions are automatic. With the L-shaped braking pedal and the L-shaped accelerator pedal mounted on the inner side of the front dash panel, or the braking and accelerator treadle means, each the width of a shoe, mounted on the sloping floor boards, the braking means being activated by action of the left foot depressing the left or brake pedal or left treadle means, with the accelerator means being activated by like action of the right foot depressing the right accelerator pedal or right treadle means, disengaging the accelerator by action of a notched ratchet camlike face at the point where said brake pedal joins the connecting shaft, said shaft journaled in an inner sleeve, same journaled in an outer sleeve, same journaled in a bearing mounted on the motor side of the automobiles front dash panel, to the accelerator arm, engaging a like notched ratchet camlike edge of the end of a sleeve extending thru and journaled in same bearing and secured to the accelerator arm, same sleeve and arm rotating on connecting shaft, driving same accelerator arm out of mesh, disengaging notched ratchet camlike clutch face of the accelerator pedal rotating on outer sleeve said shaft, rendering same accelerator arm inactive, same remaining idle, held in place by a spring means as it is disengaged from the accelerator pedal means, until the braking means, the pedal or treadle is released by the left foot being removed, thus the accelerator arm connecting with the carburetor engages the accelerator pedal or treadle by action of a spring means, driving the notched ratchet camlike face clutch means into engagement, activating the accelerator pedal or treadle when the right foot is depressed or applied. This being the safety feature of my invention, as the automobile cannot be accelerated when the brake is depressed or applied.

INVENTOR
James Ervin McC_____

INVENTOR

AUTOMATIC ACCELERATOR SAFETY DEVICE

The object of my invention, the Automatic Accelerator Safety Device, as installed on an automobile equipped with an automatic transmission, is eliminating the danger of depressing both pedals or treadles at the the same time where an emergency demands a quick braking stop, where a panicky driver might depress the accelerator pedal or treadle, when intending to depress the braking pedal or treadle. This hazard is eliminated by applying my invention.

A further object of my invention, The Automatic Accelerator Safety Device, is to provide a new means to replace the old where the addition of the automatic transmission, eliminating the need of a clutch pedal, leaving the left foot inactive, in the use of the old method of braking and accelerating with the right foot, where no change in construction of the braking and accelerating means, by the manufacturer, made the use of the right foot method necessary, with the possibility of the right foot depressing the accelerator pedal by the foot slipping off of the brake pedal, bumping the car in front, for reason of the brake failure.

Another object of my invention, The Automatic Accelerator Safety Device, is to provide use of both feet in the operation of the automobile. Simplifying driving and reducing fatigue and tension to the driver by providing an unfailing safety device, simplifying the manual controlled phases of the automobile.

The drawings for the Automatic Accelerator Safety Device are:

FIG. 1. A sectional view of the front of the automatic accelerator safety device showing detail mechanical construction.

Figure 2:
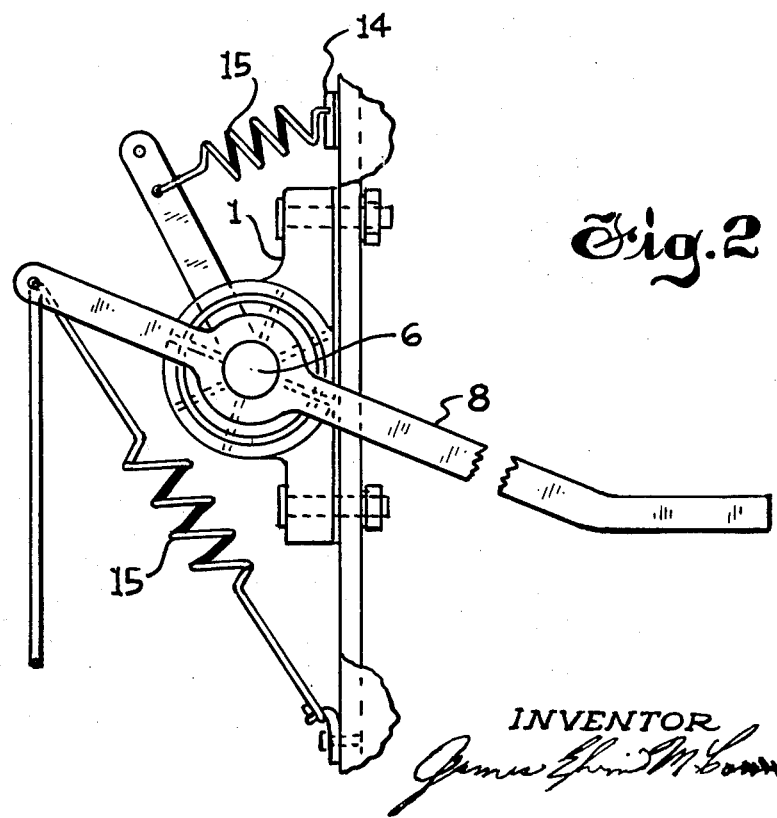

FIG. 2. A side view of FIG. 1 showing mounting features of the dash panel installation.

Figure 3:
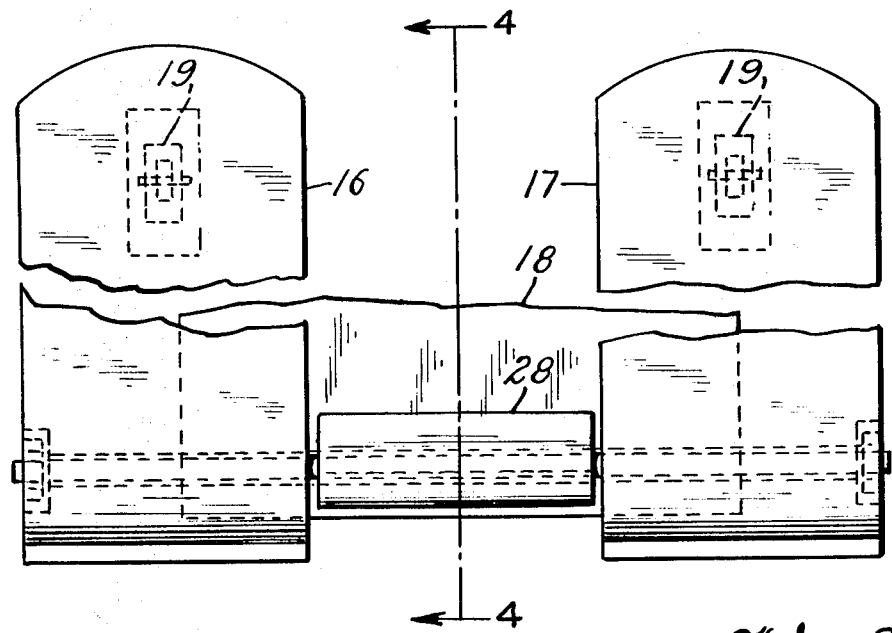

FIG. 3. Top view of modified treadles showing floor board installation and pivotal arrangement.

Figure 4:
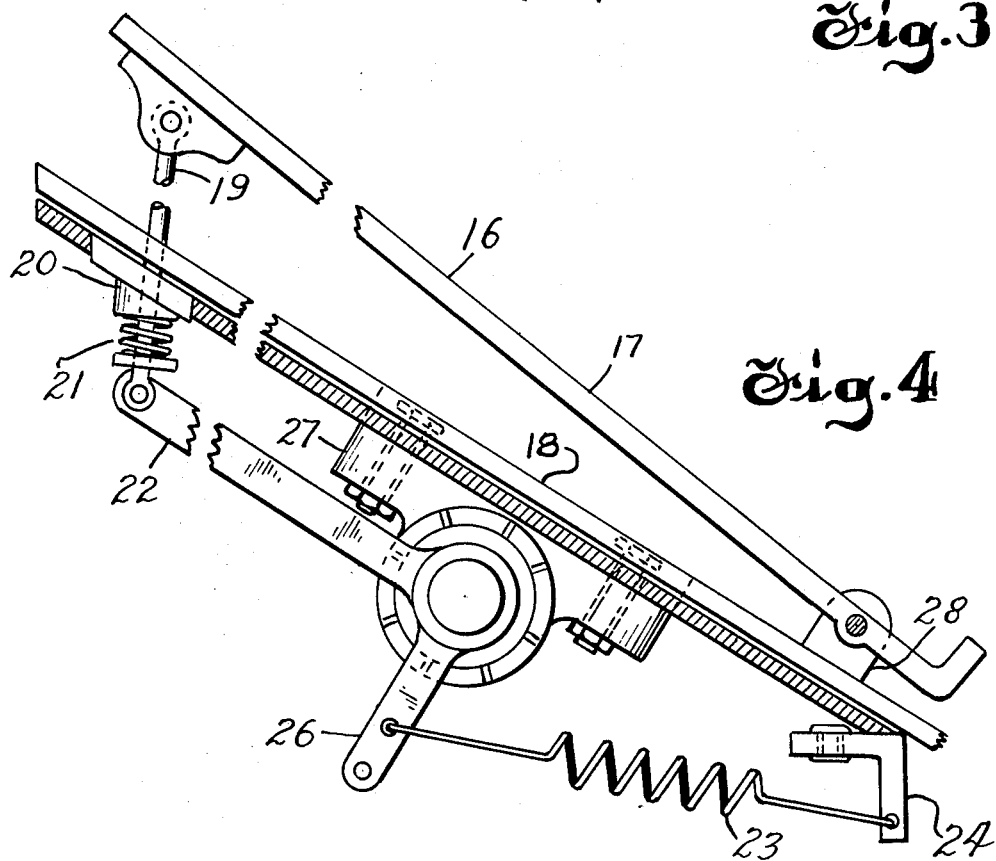

FIG. 4. A side view of FIG. 3 showing adaptation to treadle action for mounting beneath the floor boards.

The following specification, points out and describes my invention, the Automatic Accelerator Safety Device. On an automobile equipped with an automatic transmission, where the braking is actuated by means of the depressing of the left foot pedal and the accelerating means actuated by depressing the right foot pedal, being new when compared with the old, as the clutch pedal being operated by depressing the left foot, and the brake pedal by depressing the right foot, changing the right foot from the accelerator means to the brake pedal when braking is desired. The new braking and accelerating means specifically mounted on the motor side of the front dash panel, which seems to be the most simple and useful method of installing my invention, the Automatic Accelerator Safety Device. Referring to the drawings, FIGS. 1—2, the brake pedal 8, positioned on the left of the bracket bearing 1, mounted on the motor side of the front dash panel, FIG. 2, thru a slot vertically in same front dash panel, shaped as an L joined to the shaft 6, journaled in inner sleeve 9, same journaled in outer sleeve 2, is journaled in the bearing bracket 1, and positioned on the right 1, and a like shaped right or L accelerator pedal 4 rotating on said outer sleeve 2, and accelerator arm 5, rotating on said shaft 6, on the right side of the front dash panel bearing means 1, where the accelerator pedal arm 4, is held in place by the outer flanged sleeve 2, running thru and journaled in said bearing 1, to the opposite side rotating on said outer sleeve 2, said sleeve 2 rotating on shaft 6, secured by a tapped collar nut 3. The L-shaped right of accelerator pedal 4, is faced by a notched ratchet camlike means 7, that engages a like notched ratchet cam face on the accelerator arm 5 secured to inner sleeve 9, rotating on shaft 6, from the left or brake pedal 8, an inner sleeve 9, secured to the accelerator arm 5, extending thru and journaled in an outer sleeve 2 same journaled in the bearing bracket dash mounting 1, to the left or brake pedal 8, where the notched ratchet camlike edge of the sleeve 9, rotating on the shaft 6, engages a like notched ratchet camlike face 10, where the left or brake pedal 8, joins the connecting shaft 6, thus driving the accelerator arm 5, rotating on shaft 6, out of mesh when the left or brake pedal 8, is depressed, by action of the beveled camlike side of the notched ratchet camlike face 10, engaging the notched ratchetlike edge of the sleeve 9, and is held in place against the accelerator pedal 4, by a spring 12, nut 13, assembly, permitting the accelerator arm 5, to move in and out of mesh, as it rotates by action on the beveled notched ratchet camlike face 10, of the left or brake pedal 8, engaging the notched ratchet camlike edge of the sleeve 9. The accelerator being held in normal (idling) position by the springs 14, 15, said springs may be adjusted to function according to the conditions encountered when installed, remaining inactive as long as the brake is applied or depressed by the L-shaped left or brake pedal 8 said pedal 8, directly connected to the automobile-braking means, making it impossible to accelerate the motor to move the automobile forward or reverse until the left or brake pedal 8, is released by removing the left foot, activating the right or accelerator L-shaped pedal 4, as the accelerator arm 5, is driven into mesh with the accelerator pedal 4, by action of the spring 12, and nut 13, assembly.

The Automatic accelerator Safety Device may also be adapted to an automobile with automatic transmission using the floor board mounted treadle means for braking and accelerating and as shown in FIGS. 3—4, consisting of two shoe width treadles 16, 17 pivotally connected at the lower end, to the base 28, mounted on the sloping floor boards of an automobile 18. The two-foot treadles, 16, 17, act in the same manner as the L-shaped pedals, 4, 6, FIGS. 1—2. The left treadle 16, of FIG. 3, braking by depressing the left foot and the right treadle 17, accelerating by depressing the right foot, being connected to the Automatic Accelerator Safety Device by rod means of the rod 19, passing thru the floor board bracket 20, held in an in-active (idling) position by the spring 21, connecting braking arm 22, to the braking arm 11 corresponding to FIG. 1, having a notched ratchet camlike face corresponding to 10, FIG. 1, which engages a like notched ratchet camlike edge of the sleeve 9, same sleeve 9, running thru and journaled in the outer sleeve same journaled in bearing mounting 27, corresponding to the bearing mounting 1, of FIG. 1—2, the accelerator arm, 5, which is driven out of mesh when the brake treadle 16, is depressed by action of the like notched ratchet camlike face 10, engaging the notched ratchet camlike edge of the connecting inner sleeve 9, rotating on shaft 6, and is held in position by the spring 23, and is returned to normal position by action of the spring 12, and nut 13, assembly. The accelerator arm 24, is held in normal position by the spring means 23, when out of mesh. When in mesh the accelerator treadle 17, connected to accelerator arm 22, by rod means 19, engages the accelerator arm 24, corresponding to the accelerator arm 5, FIG. 1, 5, by a like means a notched ratchet camlike face 7, of the accelerator arm 5, and like notched ratchet camlike face 7, and like treadle arm corresponding to accelerator pedal 4, with the braking action being positive by a direct connected means, 19, 22, 24, with the accelerator arm 5, being out of action, when the brake is depressed, thus preventing bumping the automobile in front caused by depressing the brake and accelerating treadles at the same time. This is the safety feature and object of my invention, the Automatic Accelerator Safety Device. When installing same on different models of automobiles a means of connecting the accelerator arm 5, to the accelerating means and the braking arm 11, 26, to the braking means of the automobile, will be adapted to make the Automatic Accelerator Safety Device operative. I hereby make the following amended claims for my invention, the Automatic Accelerator Safety Device, as being new, useful and different from that which is old, and pray that letters of Patent be granted to me.

I claim:

1. An automobile equipped with an automatic transmission where no clutch is needed, a means for braking and accelerating, The Automatic Accelerator Safety Device, where both feet are used on separate L-shaped pedals, the left or brake pedal secured to a shaft journaled in an inner sleeve same journaled in an outer sleeve, same journaled in a bearing means suitably mounted on the motor side of said automobile dash panel, said inner sleeve secured to the accelerator arm, said accelerator operatively connected to the carburetor of said automobile, said accelerator arm rotating on said shaft with a notched ratchet camlike edge of said inner sleeve engaging a like notched ratchet camlike face of said left or brake pedal where it is joined to said shaft, said sleeve driving said accelerator arm, out of mesh with the right or accelerator pedal rendering same inactive, same being held in position by a coil spring means extending to the dash panel, as it rests, idling, disengaged from the accelerator pedal as it is driven out of mesh, same notched ratchet camlike clutch means of the accelerator arm separating from a like notched ratchet camlike clutch means on the right or accelerator pedal, same accelerator pedal rotating on the outer sleeve journaled in said bearing, said sleeve holding said accelerator pedal in position by a flange means, said sleeve secured at the other end by a tapped collar nut means, said accelerator arm compressing a spring means encircling said shaft secured by a washer and nut means, as it is driven out of mesh, said spring driving said clutch means into engagement with said accelerator pedal as the left or brake pedal is released by removing the foot, activating said accelerator means connecting said pedal to throttle and carburetor of said automobile.

2. An automobile equipped with an automatic transmission where no clutch is needed a means for braking and accelerating, The Automatic Accelerator Safety Device, as described in claim 1, and further including a means adapted to separate treadles mounted on a baseplate, said plate attached to the sloping floor boards, of said automobile, said treadles each being of shoe width, pivotally connected at the lower end, the depressing of the toe on the left or brake treadle acts in a like manner to depressing the left or brake pedal as described in claim 3, with the upper tip of said treadle being connected to the automatic accelerator safety device, by a rod means said rod passing thru said baseplate bracket attached to the sloping floor boards of said automobile, and held in an in-active position by a spring means positioned at the bracket where connecting rod joins the braking and the accelerator arms connecting same with bracket bearing means described in claim 1, same bracket bearing is mounted beneath the sloping floor boards, at a central part of the base plate being operatively connected to the treadle means, by a rod means, providing an alternate means for installing The Automatic Accelerator Safety Device.